United States Patent [19]
Enomoto

[11] 3,774,629
[45] Nov. 27, 1973

[54] KICKDOWN UNIT FOR AN AUTOMOTIVE AUTOMATIC POWER TRANSMISSION

[75] Inventor: Koji Enomoto, Yokohama, Japan

[73] Assingee: Nissan Motor Company Limited, Kanagawa-Ku, Yokohama, Japan

[22] Filed: Dec. 14, 1971

[21] Appl. No.: 207,759

[30] Foreign Application Priority Data
Dec. 18, 1970 Japan.............................. 45/113222

[52] U.S. Cl................................ 137/116.3, 74/867
[51] Int. Cl........................................... F16k 31/363
[58] Field of Search.................... 137/116.3; 74/867, 74/868, 869

[56] References Cited
UNITED STATES PATENTS

| | | | |
|---|---|---|---|
| 3,225,619 | 12/1965 | Schaefer...................... | 137/116.3 X |
| 3,525,275 | 8/1970 | Lemieux............................ | 74/868 |
| 3,546,974 | 12/1970 | Fox et al............................ | 74/869 |

Primary Examiner—Robert G. Nilson
Attorney—John Lezdey

[57] ABSTRACT

A kickdown unit for effecting a forced downshift in an automotive automatic power transmission, which kickdown unit comprises a valve body, a valve chamber formed in the valve body, a valve spool slidably disposed in the valve chamber and having a relatively large valve land and a relatively small valve land biasing means for urging the valve spool in one direction, inlet and outlet ports communicating with the valve chamber, a control pressure port communicating with the valve chamber at a position to cause the control pressure therein to continuously act on the relatively large valve land for thereby urging the valve spool in another direction, a drain port communicating with said valve chamber and the degree of communication therebetween being controlled by said relatively large valve land and a nozzle leading from the valve chamber, said nozzle being opened and closed for controlling the control pressure acting on the relatively large valve land.

12 Claims, 6 Drawing Figures

KICKDOWN UNIT FOR AN AUTOMOTIVE AUTOMATIC POWER TRANSMISSION

This invention relates to an automotive automatic power transmission and, more particularly, to a kickdown unit adapted to effect a forced downshift during kickdown operation in the power transmission.

As is well known in the art, an automatic power transmission used in a motor vehicle commonly includes a hydraulic control system which is arranged to produce a shift pattern for selectively effecting a desired gear ratio in accordance with variations in vehicle speed and engine load. To detect vehicle speed, a fluid pressure governor valve is utilized which produces a fluid pressure increasing upon an increase in vehicle speed. This fluid pressure will be hereinafter referred to as a governor pressure. The engine load is detected by a modulating valve which responds to variations in intake manifild vacuum of an engine or the position of an accelerator pedal to modulate a line pressure supplied from an engine driven oil pump. This modulated line pressure will be hereinafter called a throttle pressure. The governor pressure and the throttle pressure thus obtained are utilized in the hydraulic control system for controlling shift valves to selectively actuate plurality of friction elements for thereby providing the desired gear ratio.

A kickdown valve has been conventionally provided in the hydraulic control system for effecting a forced downshift in the power transmission to permit rapid acceleration under certain circumstances. In this prior practice, it is common practice to employ a solenoid which is usually arranged to actuate a valve spool over its entire travel against the force of counteracting spring means. In such cases, the valve spool must be precisely guided and the spring relatively powerful, resulting in relatively large capacity and high electric power consumption. Furthermore, the conventional kickdown valve is so constructed as to selectively supply the line pressure to the associated shift valve for biasing the same in a direction opposite to the governor pressure exerted thereon. Consequently, it is required that the shift valve associated with such kickdown valve be formed with an additional valve land on which the line pressure acts resulting in complicated construction.

The principal object of the present invention is to provide an improved kickdown unit which overcomes the drawbacks referred to and which is specifically suited for use in an automotive automatic power transmission.

Figure 1:
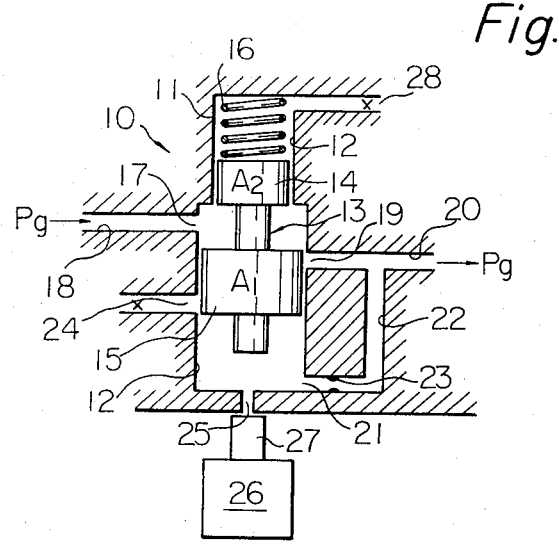
FIG. 1 is a sectional view of the kickdown unit according to the present invention.

Referring now to FIG. 1, there is shown in section a kickdown unit according to the present invention, which is generally indicated by reference numeral 10. The kickdown unit 10 includes a valve body 11 having therein a valve chamber 12, in which a valve spool 13 is slidably disposed. The valve spool 13 is formed with a relatively small valve land 14 and a relatively large valve land 15. A biasing means 16 is provided for biasing the valve spool 13 downwardly of the drawing. In the illustrated embodiment, the biasing means 16 is shown as a spring, which is associated with the small valve land 14.

An inlet port 17 is formed in the valve body 11 and communicates with a fluid pressure supply passage 18, which in turn communicates with a fluid pressure governor valve (now shown) of the hydraulic control system in the power transmission so that a governor pressure which varies in proportion to the vehicle speed is supplied to the inlet port 17. In the illustrated embodiment of FIG. 1, the inlet port 17 communicates with the valve chamber 12 at a position between the valve lands 14 and 15.

The valve body 11 has formed therein an outlet port 19 which communicates with the valve chamber 12. The outlet port 19 communicates with a discharge passage 20, which in turn communicates with a shift valve (now shown) of the hydraulic control system in the power transmission. The communication between the inlet and outlet ports 17 and 19 is controlled by the valve land 15 of the valve spool 13. The fluid pressure delivered to the valve chamber 12 between the valve lands 14 and 15 acts on the differential area therebetween for biasing the valve spool 13 downwardly of the drawing with the force of the spring 16.

The bias the valve spool 13 upwardly as viewed in FIG. 1, a control pressure port 21 is provided which introduces an output pressure appearing at the outlet port 19 into the valve chamber 12 as a control pressure. The control pressure admitted to the valve chamber 12 acts on the valve land 15 to bias the valve spool 13 upwardly against the counteracting forces. In FIG. 1, the control pressure port 21 is shown as connected to the outlet port 19 through a branch passage 22, so that the output pressure at the outlet port 19 is introduced as the control pressure to the control pressure port 21. The control pressure port 21 may be provided therein a orifice 23 which restricts the rate of fluid flow therethrough.

A drain port 24 communicates with the valve chamber 12 and the degree of communication therebetween is controlled by the valve land 15 of the valve spool 13 so that the output pressure appearing at the outlet port 19 is varied.

A nozzle 25 leads from the valve chamber 12 and is associated with the orifice 23 to vary the output pressure acting on the large valve land 15 thereby to control the movement of the valve spool 13.

To open and close the nozzle 25, an actuator 26 is provided which has a plunger 27 adapted to selectively protrude and retract in accordance with an electric signal applied thereto. The plunger 27 is positioned opposite to the nozzle 25 and is associated therewith for thereby controlling the control pressure acting on the valve land 15, as previously noted. The actuator 26 may be of a solenoid or of any other suitable construction.

Indicated at 28 is a drain port 28, through which an excessive fluid is drained off.

Figure 2:
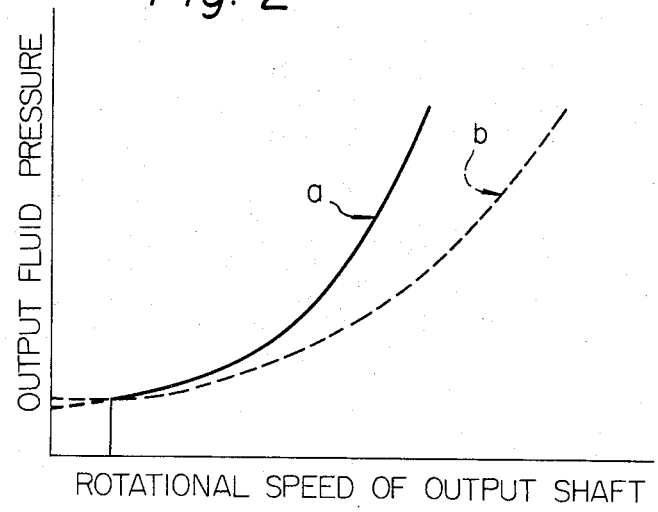
FIG. 2 is a graph illustrating the characteristic of the kickdown unit of FIG. 1.

When, the operation, the actuator 26 is deenergized, then the plunger 27 retracts so that the nozzle 25 is opened. With the nozzle 25 being opened, the control pressure prevailing in the valve chamber 12 is released through the nozzle 25 resulting in a drop in the control pressure acting on the valve land 15. This causes the opposing forces acting on the valve spool 13 to overcome the force developed by the control pressure. Accordingly, the valve spool 13 is moved downwardly of the drawing, so that the drain port 24 is closed by the valve land 15 whereas the outlet port 19 is brought into communication with the inlet port 17. Thus, the governor pressure delivered to the inlet port 17 is allowed into the outlet port 19 and, therefore, the governor pressure or the output fluid pressure appearing at the outlet port 19 varies in a manner as shown by a curve $a$ (FIG. 2).

When, in contrast, the actuator 26 is energized, the plunger 27 is caused to protrude thereby closing the nozzle 25. Then, the control pressure acting on the valve land 15 increases so that the magnitude thereof will be sufficient to urge the valve spool 13 upwardly against the opposing force acting upon the differential area between the valve lands 14 and 15 and the force of the spring 16. In this condition, the drain port 24 is opened by the valve land 15 and, accordingly, the control pressure in the valve chamber 12 is released resulting in a decrease in the control pressure. When this occurs, the valve spool 13 is moved again downwardly by the opposing forces exerted thereon. Under these conditions, the valve spool 13 is situated in a position where the force developed by the control pressure balances with the opposing forces.

Now assuming that the valve spool 13 is positioned in balanced condition, then the following equation will be obtained:

$$(A_1 - A_2)P_g = A_1 P_g' - f$$

and, therefore, $$P_g' = \frac{A_1 - A_2}{A_1} P_g + \frac{f}{A_1}$$

wherein $A_1$ and $A_2$ are effective sectional areas of valve lands 15 and 14, $f$ the spring force, $P_g$ the governor pressure at the inlet port 17 and $P_g'$ the output fluid pressure at the outlet port 19. Thus, it will be understood that the output fluid pressure varies in such a manner as shown by a curve $b$ in FIG. 2.

Figure 3:
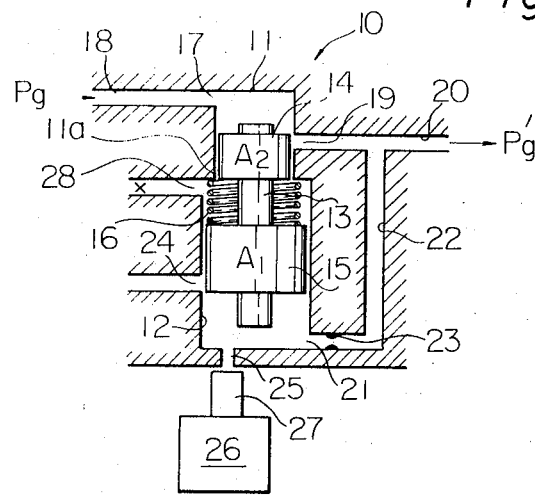
FIG. 3 is a sectional view showing a modified form of the kickdown unit shown in FIG. 1.

A modification of the kickdown unit 10 of FIG. 1 is illustrated in FIG. 3, wherein like component parts are designated by the same numerals. This modified form of the kickdown unit 10 is similar to that of FIG. 1 except that the inlet port 17 is provided in a position to cause the governor pressure to be applied on the upper side of the valve land 14, that the degree of communication between the inlet and outlet ports 17 and 19 is controlled by the relatively small valve land 14, that the drain port 28 communicates with the valve chamber 12 between the valve lands 14 and 15, and that the spring 18 is disposed between the valve land 15 and a shoulder portion 11a of the valve body 11. The operation of this modification is the same with that of first embodiment and, therefore, the describing of the same is herein omitted for the sake of simplicity of description.

Figure 4:
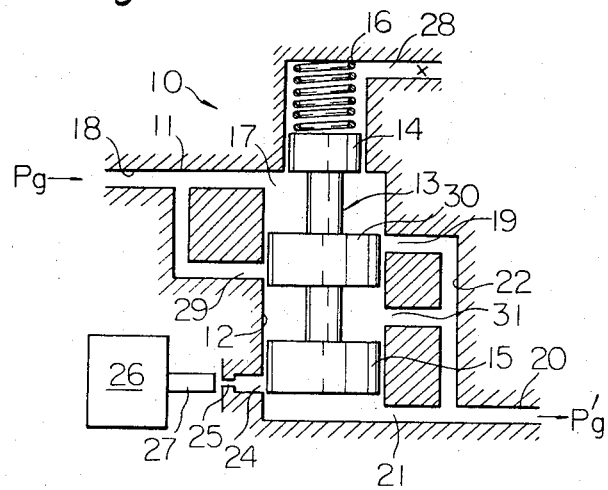
FIG. 4 is a sectional view of another modified form of the kickdown unit shown in FIG. 1.

Another modified form of the kickdown unit according to the present invention is illustrated in FIG. 4. In this modification, the kickdown unit 10 is further provided with an auxiliary inlet port 29 which is formed in the valve body 11. The auxiliary inlet port 29 communicates with the valve chamber 12 at a position to be opened and closed by an auxiliary valve land 30. The auxiliary valve land 30 is formed on the valve spool 13 and has the same diameter in section with the valve land 15. An auxiliary outlet port 31 is also formed in the valve body 11 and communicates with the valve chamber 12. The auxiliary outlet port 31 communicates with the outlet port 19 with which the control pressure port 21 also communicates through the branch passage 22. In this illustrated embodiment, the nozzle 25 leads through the drain port 24 from the valve chamber 12 and the orifice 23 is dispensed with.

When, in operation, the actuator 26 is energized, the plunger 27 is caused to retract thereby opening the nozzle 25. The control pressure distributed to the drain port 24 is then drained off through the nozzle 25 to decrease the control pressure acting on the valve land 15. Consequently, the valve spool 13 is moved downwardly of the drawing by the force acting on the differential area between the valve lands 14 and 30 and the force of the spring 16. This causes the outlet port 19 to communicate with the inlet port 17, to which the governor pressure is distributed. The governor pressure distributed to the outlet port 19 is then delivered through the branch passage 22 to the auxiliary outlet port 31 and the control pressure port 21. The governor pressure in the control pressure port 21 is introduced to the valve chamber 12 as the control pressure, which acts on the valve land 15. If, in this instance, the drain port 24 is closed by the valve land 15, the force developed by the control pressure in the valve chamber 12 is sufficient to urge the valve spool 13 upwardly against the opposing forces acting thereon. Accordingly, the drain port 24 is opened again by the valve land 15. Under these conditions, the valve spool 13 is situated in the valve chamber 12 in a position where the forces acting on the valve spool 13 balance with each other. Thus, the output fluid pressure appearing at the outlet port 19 or discharge passage 20 varies in a manner as shown by the curve $b$ in FIG. 2.

When, in contrast, the actuator 26 is de-energized, the plunger 27 protrudes so that the nozzle 25 is closed. With the nozzle 25 being closed, the control pressure prevailing in the valve chamber 12 increases thereby moving the valve spool 13 upwardly against the opposing forces. Consequently, the auxiliary outlet port 31 is brought into communication with the auxiliary inlet port 29 and, therefore, the governor pressure therein is passed through the branch passage 22 to the fluid pressure discharge passage 20. In this condition, the governor pressure available to the passage 20 varies in a manner as shown by the curve $a$ in FIG. 2.

Figure 5:
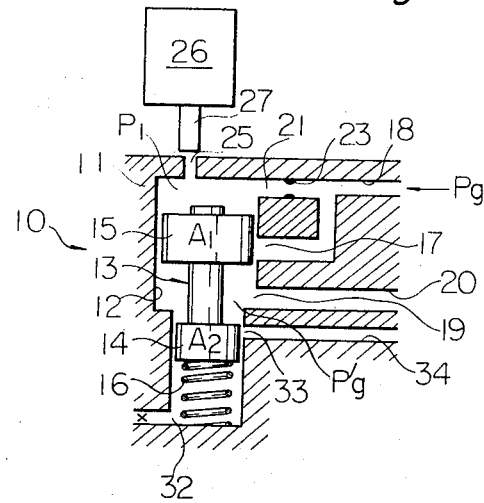
FIG. 5 is a sectional view of still another modified form the kickdown unit shown in FIG. 1.

FIG. 5 illustrates still another modified form of the kickdown unit according to the present invention. In this modified form, the shift valve 10 further includes an additional inlet port 33, which is selectively brought into communication with the outlet port 19 by the relatively small valve land 14. The communication between the inlet and outlet ports 17 and 19 is selectively established by the relatively large valve land 15. The additional inlet port 33 communicates with a line pressure supply passage 34 which may be connected to a source of line pressure. In FIG. 5, the control pressure port 21 is shown as communicating with the governor pressure supply passage 18 which communicates with the inlet port 17.

When, in operation, the actuator 26 is energized, the plunger 27 retracts so that the nozzle 25 is opened. In this condition, the control pressure in the valve chamber 12 is released through the nozzle 25, while the governor pressure in the passage 18 is distributed as the control pressure to the control pressure port 21 through the orifice 23. Accordingly, the control pressure decreases below the governor pressure prevailing in the passage 18. This causes the valve spool 13 to move upwardly of the drawing by the force acting on the differential area between the valve lands 14 and 15 and the force of the spring 16. When this occurs, the outlet port 19 is brought into communication with the inlet port 17, from which the governor pressure is admitted to the fluid pressure discharge 20. It is to be noted that the valve spool 13 is maintained in the upward position when the following relation exists:

$$A_1 P_1 < (A_1 - A_2) P_g + f$$

where $A_1$ and $A_2$ indicate the effective sectional areas of valve lands 15 and 14, $P_1$ the control pressure acting on the relatively large valve land 15 and $P_g$ the governor pressure prevailing in the passage 18. It will be appreciated that the output fluid pressure available to the passage 20 varies in a manner as shown by a curve $c$ in FIG. 6 during kickdown operation.

When, in contrast, the actuator 26 is deenergized, then the plunger 27 is caused to protrude so that the nozzle 25 is closed. As the nozzle 25 is closed by the plunger 27 of the actuator 26, the control pressure acting on the relatively large valve land 15 will be equal in level to the governor pressure in the passage 18. As previously noted, the governor pressure increases in proportion to the rotational speed of the output shaft of the power transmission, so that the valve spool 13 will be moved downwardly against the force acting on the differential area between the valve lands 14 and 15 and the force of the spring 16. The force biasing the valve spool 13 downwardly as viewed in FIG. 5 is expressed by $A_1 \times P_1 = (A_1 \times P_g)$, while the force biasing the valve spool 13 upwardly of the drawing is expressed by $(A_1 - A_2) P_g'$, where $P_g'$ indicates the pressure acting on the differential area between the valve lands 14 and 15. As discussed above, if the governor pressure increases, then the valve spool 13 is moved downwardly so that the additional inlet port 33 is caused to communicate with the valve chamber 12 by the valve land 14 whereas the inlet port 17 is prevented from communication with the valve chamber 12. Consequently, the line pressure in the passage 34 is admitted to the valve chamber 12 thereby increasing the pressure $P_g'$ therein. As a result, the force acting on the differential area between the valve lands 14 and 15 and the force of the spring 16 overcome the opposing force acting on the valve land 15. This causes the valve spool 13 to move upwardly of the drawing. Under these conditions, the valve spool 13 will be situated in a position where the counteracting forces balance with each other. This balanced condition is expressed by the following equation:

$$A_1 P_g = (A_1 - A_2) P_g' + f$$

Figure 6:
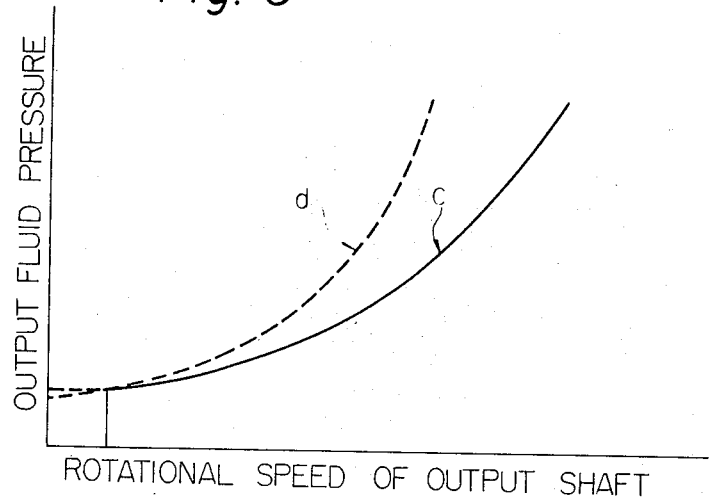
FIG. 6 is a graph illustrating the characteristic of the kickdown unit shown in FIG. 5.

It will thus be seen that the pressure $P_g'$ will vary in a manner as shown by a curve $d$ in FIG. 6.

It will now be appreciated that the actuator of the kickdown unit implementing the present invention is so arranged as to need a short travel of a few tenths of a millimeter while the actuator will have only very low power consumption.

It will further be understood that the kickdown unit according to this invention is simple in construction and economical to manufacture.

It will also be noted that the kickdown unit embodying the present invention is arranged to provide a lower fluid pressure to the associated shift valve during kickdown operation whereby a shifting point will be varied to a higher vehicle speed side.

What is claimed is:

1. A kickdown unit for an automotive automatic power transmission, comprising a valve body, a valve chamber formed in said valve body, a valve spool slidably disposed in said valve chamber and having a relatively large valve land and relatively small valve land, biasing means for biasing said valve spool in one direction, an inlet port formed in said valve body and communicating with said valve chamber, an outlet port formed in said valve body and communicating with said valve chamber, a control pressure port communicating with said valve chamber at a position to cause a control pressure therein to continuously act on said large valve land for thereby biasing said valve spool in another direction against the force of said biasing means, a drain port communicating with said valve chamber and the degree of communication therebetween being controlled by said relatively large valve land for thereby varying an output pressure appearing at said outlet port, and a nozzle leading from said valve chamber, said nozzle being opened and closed for controlling said control pressure acting on said large valveland.

2. A kickdown unit according to claim 1, further comprising an actuator having a plunger associated with said nozzle to vary said control pressure exerted on said large valve land.

3. A kickdown unit according to claim 2, wherein said biasing means is a spring.

4. A kickdown unit according to claim 3, wherein said control pressure port communicates with said outlet port.

5. A kickdown unit according to claim 1, further comprising an auxiliary inlet port communicating with said inlet port and an auxiliary outlet port communicating with said outlet port, and wherein said valve spool further includes an auxiliary valve land between said small and large valve lands to control fluid communication between said auxiliary inlet and outlet ports.

6. A kickdown unit according to claim 5, wherein said control pressure port communicates with said auxiliary outlet port communicating with said outlet port.

7. A kickdown unit according to claim 5, wherein said biasing means is a spring.

8. A kickdown unit according to claim 7, further comprising an actuator having a plunger associated with said nozzle to open and close said nozzle.

9. A kickdown unit according to claim 8, wherein said nozzle leads from said valve chamber through said drain port.

10. A kickdown unit according to claim 1, further comprising an additional inlet port, said small valve land controlling fluid communication between said additional inlet port and outlet port whereas said large valve land controls fluid communication between said inlet and outlet ports.

11. A kickdown unit according to claim 10, further comprising an actuator having a plunger associated with said nozzle to open and close said nozzle.

12. A kickdown unit according to claim 11, wherein said inlet port communicated with said control pressure port.

* * * * *